United States Patent
Yen

(10) Patent No.: US 7,651,623 B2
(45) Date of Patent: Jan. 26, 2010

(54) USE OF DECANTER CENTRIFUGE IN POLYMER PROCESSING

(75) Inventor: Jeffrey Yen, Woolwich Township, NJ (US)

(73) Assignee: Arkema Inc., Philadelphia, PA (US)

( * ) Notice: Subject to any disclaimer, the term of this patent is extended or adjusted under 35 U.S.C. 154(b) by 138 days.

(21) Appl. No.: 11/816,475

(22) PCT Filed: Mar. 13, 2006

(86) PCT No.: PCT/US2006/009012

§ 371 (c)(1),
(2), (4) Date: Aug. 16, 2007

(87) PCT Pub. No.: WO2006/101813

PCT Pub. Date: Sep. 28, 2006

(65) Prior Publication Data

US 2008/0171843 A1    Jul. 17, 2008

Related U.S. Application Data

(60) Provisional application No. 60/662,431, filed on Mar. 16, 2005.

(51) Int. Cl.
*B04B 1/20*   (2006.01)
*C08J 3/05*   (2006.01)

(52) U.S. Cl. .............. 210/787; 210/374; 210/380.1; 210/380.3; 494/37; 494/50; 523/335; 523/342; 526/255; 528/502 D

(58) Field of Classification Search ............... 525/335, 525/342; 494/37, 50, 51, 52, 53, 54, 55; 210/787, 374, 380.1, 380.3; 528/502 D; 526/255; 523/335, 342
See application file for complete search history.

(56) References Cited

U.S. PATENT DOCUMENTS

| | | | | |
|---|---|---|---|---|
| 2,718,452 | A | * | 9/1955 | Lontz |
| 3,536,683 | A | * | 10/1970 | Bailor et al. |
| 5,944,597 | A | * | 8/1999 | Singh et al. |
| 6,110,995 | A | * | 8/2000 | Hunter et al. |
| 6,123,656 | A | * | 9/2000 | Michelsen |
| 6,537,191 | B1 | * | 3/2003 | Stroucken et al. |

* cited by examiner

*Primary Examiner*—David A Reifsnyder
(74) *Attorney, Agent, or Firm*—Thomas F. Roland

(57) ABSTRACT

The present invention relates to a process for the removal of solvent from a polymer emulsion or suspension, by use of a decanter centrifuge (10). The decanter centrifuge (10) provides an efficient thickening method. The process is especially useful for emulsion or suspension polymer compositions having high levels of solvent (low polymer solids) that could benefit from a thickening or dewatering step prior to drying in a dryer (14).

18 Claims, 1 Drawing Sheet

USE OF DECANTER CENTRIFUGE IN POLYMER PROCESSING

This application claims benefit, under U.S.C. §119 or §365 of U.S. Provisional Application No. 60/662,431, filed Mar. 16, 2005; and PCT/US2006/009012 filed Mar. 13, 2006.

FIELD OF THE INVENTION

The present invention relates to a process for the removal of solvent from a polymer emulsion or suspension, by use of a decanter centrifuge. The decanter centrifuge provides an efficient thickening method. The process is especially useful for emulsion or aqueous suspension polymer compositions having high levels of solvent which may include water (low polymer solids) that could benefit from a thickening or dewatering step prior to drying.

BACKGROUND OF THE INVENTION

A decanter centrifuge comprises a hollow drum cylindrical/conical cross-section rotatably supported by bearings and having a helical conveyor therein, rotatably supported by bearings relative to the drum. These centrifuges are used primarily where the mixture to be treated has a relatively large content of solids, or where the content of particles in a mixture varies greatly or varies greatly in size. They also find use in applications where relatively large volumes of liquid are treated. They provide a satisfactory separation despite large flows per unit time. Decanter centrifuges are used to separate solids from a liquid mixture in which the solids in the form of particles are suspended in a liquid having a density either greater or less than that of the particles. The major use of decanter centrifuges is in the treatment of sludge from sewage treatment plants (U.S. Pat. No. 6,123,656 and U.S. Pat. No. 6,537,191), though they have also found use in oil recovery systems (U.S. Pat. No. 6,214,236), and for defatting meats and other food products (U.S. Pat. No. 5,944,597).

Decanter centrifuges have also been used to concentrate dehydrated emulsions of water soluble polymers in a water-in-oil polymer emulsion (U.S. Pat. No. 6,110,995).

U.S. Pat. No. 2,718,452 describes a process for forming polytetrafluoroethylene organosols, in which the layer containing the organosol is decanted, and then centrifuged to remove occluded water. U.S. Pat. No. 3,536,683 described a process for isolating fluorine-containing polymers involving agglomerating the polymer by adding electrolyte, followed by separation of the agglomerates from the supernatant liquid in a bowl centrifuge, washing and re-centrifuging prior to drying. The washing helps remove electrolyte, which would be an undesired impurity in the final dried products, but the washing step adds complexity to the process, and adds additional water to the polymer, making drying more difficult.

It is known to remove water or aqueous solution from polymer latex emulsion by various means. Some examples are thickener, filter, etc. In a current commercial practice fluoropolymer latex is processed through an agitated vessel(s) with or without latex washing, latex thickening and finally dried. Optionally, latex washing can be conducted in an agitated vessel or after the agitated vessel as a separate unit operation. The conventional thickening operation has its limitation on the dewater efficiency and overall yield, and the dewatered polymer latex stream still contains a large amount of water, requiring added processing time and energy for its removal. Furthermore, the carryover in the aqueous discharge can be high and reduces the overall process yield. Such fluoropolymer slurry typically floats to the top of the thickening device since its density is less than that of water leading to a low thickening efficiency. In some fluoropolymer operations, reverse osmosis has been mentioned for thickening, in which the operating difficulties, such as membrane fouling, is known.

There is a need for a thickening or dewatering process that operates at higher throughput, higher efficiency, removes more solvent or water (produces a higher polymer solids) and generates higher yield than current processes. The need is especially great for emulsion or aqueous suspension polymers produced at a relatively low solids level, and therefore containing large amounts of solvent or water.

Surprisingly it has been found that the use of a decanter centrifuge in the processing of aqueous polymer emulsions and suspensions, such as a fluoropolymer latex, offers a high throughput and improves the thickening efficiency while providing a consistent solid content in the dewatered polymer latex. Optionally, a horizontal decanter centrifuge is used. The decanter centrifuge can be used to process any polymer suspension, solution or mixture having significantly large particles (which can be masses consisting of more than one polymer particle, such as agglomerates or coagulants), where there is a density different (either more or less) between the polymer particles and the continuous aqueous phase. In the case of fluropolymers, it was found that the polymer agglomerates were less dense than the aqueous phase. Polymer agglomerates are typically derived from the combination or aggregation of colloidal polymer particles dispersed or suspended in a liquid into clusters or matrixes.

The decanter result for the fluoropolymers is unexpected since conventional operation of a decanter centrifuge typically involves a solid component that is denser than the liquid component on the theory that the denser phase travels faster than the less dense phase in a centrifugal field. In the process of the invention the polymer-agglomerates are less dense than the continuous (solvent) phase. Depending on the operating parameters of the decanter centrifuge, the polymer agglomerates can be discharged as the higher solids floater. The solid content of the solid discharge can be either increased or decreased by adjusting operating parameters of the decanter centrifuge.

SUMMARY OF THE INVENTION

The problems described above are solved by a method for processing a polymer emulsion or suspension comprising the step of thickening said emulsion or suspension using a decanter centrifuge.

DETAILED DESCRIPTION OF THE INVENTION

Figure 1:
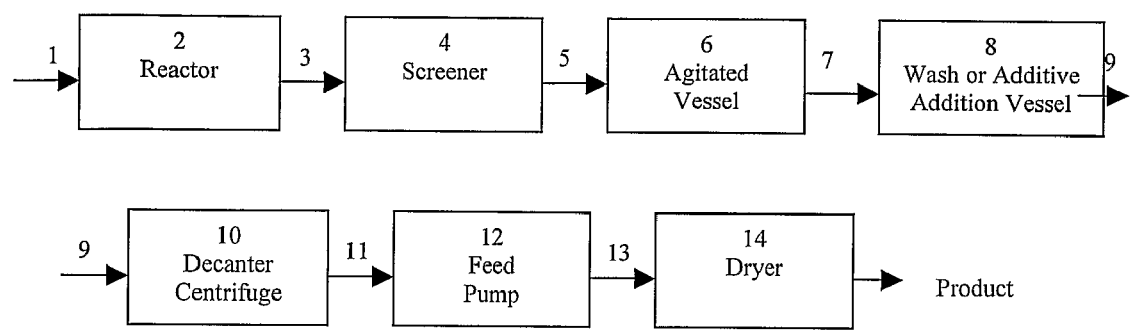
FIG. 1: shows a flow diagram for one method of processing a polymer latex or suspension using a horizontal decanter centrifuge.

The term "polymer agglomerates" as used herein means clusters, matrixes or aggregates that typically derived from the combination or aggregation of colloidal polymer particles that had been dispersed or suspended in a liquid.

By "thickening" of a polymer emulsion or suspension containing a continuous phase and polymer agglomerates, as used herein, means to increase the weight percentage of polymer agglomerates by removing some of the continuous phase.

The invention relates to the use of a decanter centrifuge in the thickening operation of a polymer emulsion or suspension composition. The decanter centrifuge is especially useful in the processing of polymer compositions having large amounts of water or other solvents (low polymer solids levels). By increasing the level of solids in the thickening operation, throughput through a dryer can be increased, and energy consumption decreased.

The process of the invention is especially useful for polymer compositions in the form of an aqueous emulsion or suspension of polymer particles. In a preferred embodiment, the polymer is a fluoropolymer. Fluoropolymers for which the present process is useful include, but are not limited to, homopolymers, such as polyvinylidene fluoride, or copolymers, such as, but not limited to, vinylidene fluoride/hexafluoropropylene copolymer, vinylidene fluoride/chlorotetrafluoroethylene copolymer, vinylidene fluoride/tetrafluoroethylene copolymer, ethylene/tetrafluoroethylene copolymer, fluorinated ethylene propylene (FEP) and mixtures thereof. The solvent or continuous phase includes, but is not limited to, water and organic solvents.

Preferably the fluoropolymer is a polyvinylidene fluoride polymer. "PVDF" or PVDF resin or PVDF polymer refers not only to homopolymers of PVDF but also to copolymers prepared from at least about 75% by weight of vinylidene fluoride (VDF) monomer. Comonomers may include other fluorinated monomers such as: hexafluoropropylene (HFP), chlorotetrafluoroethylene (CTFE), tetrafluoroethylene (TFE), and vinyl fluoride.

Typically, following polymerization, the polymer is agitated, thickened and dried. The step of washing is optional, which can remove impurities and improve product quality. The drying step is used when dry powder or pellets are desired, though the concentrated polymer could be sold in a wet state, and further processed into final product. Coagulation or agglomeration is optionally and preferably used to increase the effective particle size for easier separation from the continuous phase. Typically polymer aggregates for separation in the decanter centrifuge have an average diameter of more than 1 micron, preferably more than 2 microns, and most preferably over 5 microns. A preferred range for the average diameter is from 2 to 20 microns.

One embodiment of the invention is illustrated in FIG. 1. The polymerization reaction is carried out in a polymerization reactor vessel 2, either batchwise or continuous. Monomer, initiator, additives, etc. are fed into vessel 2 through line 1. After the reaction is complete, the reactor effluent is filtered through a screener 4 and then sent to an agitated vessel 6 and an optional wash or additive addition vessel 8. Additives can be optionally added to the polymer composition during the processing of the polymer. The typical polymer solids content in line 9 is 1-30 weight %, and preferably 2 to 20 weight percent. The effluent is then sent to a decanter centrifuge 10 for thickening. Preferably, the decanter centrifuge 10 is a horizontal type centrifuge. In this invention, the residence time is defined as the volumetric flow rate of the feed divided by the volume of the continuous phase pool of the decanter centrifuge. Depending on rotation speed, throughput, particle size and shape, density difference, solution viscosity, polymer concentration, etc., the polymer content in the centrifuge effluent line 11 can vary from over 20 weight % to over 45 weight %. It has been found that an advantage to the process of the invention is that the polymer content in the effluent of line 11 is extremely consistent for the same set of process conditions of the decanter centrifuge (G force, feed rate, scroll speed, etc.). The consistency is generally within +/−0.5 weight percent, while conventional processes will generally vary by up to +/−2.0 weight percent in solids. Line 11 can then be fed to a dryer 14. Useful dryers include, but are not limited to, belt dryers, rotary dryers, fluid bed dryers, spray dryers, etc. Optionally, a slurry feed pump 12 can be added in Line 11 to facilitate the feed pump to the dryer of choice.

The decanter centrifuge is typically run at a pool volume of 10% to 95% of the maximum pool volume, and preferably between 40% and 90%. In one preferred embodiment, the decanter centrifuge contains a floater disc in the discharge side of the continuous phase. A typical beach angle for the decanter centrifuge is between 5 to 25 degrees and preferably between 8 and 15 degrees. A typical bowl length to bowl diameter ratio is from 1:1 to 4:1, and preferably 2:1 to 4:1.

In another process, the concentrated solids product from the decanter can be sold without further drying, and be processed into final product.

The decanter centrifuge is typically run at from 100 to 5000 times gravity, and preferably at from 200 to 3500. It was found that the level of thickening increased as the centrifugal force was increased. Residence time is generally between 5 seconds and 10 minutes, and preferably from 10 seconds to 5 minutes. The optimal centrifugal force and residence time is dependent on many factors, including but not limited to, polymer composition, feed rate, density, solids level, particle size and shape, solution viscosity, density difference between the polymer and aqueous phase, diameter, pool depth, channel configuration, beach angle, length/diameter ration of the subject decanter centrifuge, etc.

EXAMPLES

The following examples are set forth to demonstrate the invention but are not to be construed as narrowing the breadth thereof. PVDF is used in the examples.

The stream from the wash/additive addition vessel as used herein has the following typical content and properties:

| | |
|---|---|
| Average polymeric particle size: | 5-10 microns |
| Composition: | |
| PVDF | 2-8% |
| Water | 89-97% |
| $VF_2$ | trace |
| Surfactant | trace |
| Density: | 0.9-0.999 g/cc |

Examples 1-2

Comparative

In a commercial thickening operation, the PVDF stream is thickened in a settling vessel or thickener prior to spray drying. The typical performance of the thickener is summarized below:

TABLE 1

| | Exp No. | Polymer content in dewatered effluent, wt % | Polymer content in Aqueous effluent, ppm |
|---|---|---|---|
| PVDF | 1 | 20-23% | 500-700 |
| PVDF | 2 | 16-19% | 500-700 |

Examples 3-13

A PVDF sample from the wash/additive addition vessel was processed with a 6" horizontal decanter centrifuge with the following equipment configuration:

Bowl diameter: 152 mm
Bowl length: 356 mm
Beach angle: 10 degree under various centrifugal forces and operating conditions. The polymer content in the feed is 3.3-4.1% by weight. The results are summarized in TABLE 2:

TABLE 2

| Sample | Exp No. | Centrifugal Force in G | Feed Rate in GPM | Scroll Speed In rpm | Pond Depth In mm | Polymer content in PVDF Effluent wt % | Polymer content in Aqueous Effluent vol % | Solid Recovery in % |
|---|---|---|---|---|---|---|---|---|
| PVDF | 2 (Base Case) | | | | | 16-19% | | |
| | 3 | 1367xG | 2.1 | 30.5 | 1.3-1.8 | 38.8 | 0.04 | 99.9 |
| | 4 | 1367xG | 1.7 | 30.5 | 1.3-1.8 | 38.1 | 0.07 | 99.9 |
| | 5 | 3076xG | 1.7 | 30.5 | 1.3-1.8 | 42.1 | 0.03 | 99.9 |
| | 6 | 3076xG | 0.8 | 30.5 | 1.3-1.8 | 42.5 | 0.05 | 99.9 |
| | 7 | 3076xG | 0.7 | 21.1 | 1.3-1.8 | 44.4 | 0.02 | 99.9 |
| | 8 | 3076xG | 1.6 | 21.1 | 1.3-1.8 | 44.1 | 0.03 | 99.9 |
| | 9 | 1367xG | 2.4 | 30.5 | 1.6-2.0 | 41.5 | 0.07 | 99.8 |
| | 10 | 1367xG | 2.1 | 30.5 | 1.6-2.0 | 36.8 | 0.13 | 99.5 |
| | 11 | 1367xG | 1.3 | 42.1 | 1.4-1.9 | | 0.04 | |
| | 12 | 1367xG | 1.9 | 42.1 | 1.4-1.9 | 35.8 | 0.08 | 99.7 |
| | 13 | 1367xG | 2.9 | 42.1 | 1.4-1.9 | 35.8 | 0.15 | 99.5 |

Compared to Example 2, the thickening efficiency with PVDF with horizontal decanter centrifuge was much higher when the centrifugal force was over 1367xG.

Examples 14-16

A PVDF sample from the wash/additive addition vessel was processed with a 6" horizontal decanter centrifuge under various centrifugal forces and operating conditions. The decanter is equipped with plough tiles and a floater disc. The polymer content in the feed is approximately 4.4% by weight. The results are summarized in Table 3 below:

TABLE 3

| Exp No. | Centrifugal Force in G | Feed Rate in GPM | Scroll Speed In rpm | Pond Depth In mm | Polymer content in PVDF Effluent wt % |
|---|---|---|---|---|---|
| 1 (Base Case) | | | | | 16-19% |
| 14 | 1489xG | 1.19 | 28.2 | 1.3-1.8 | 29.6 |
| 15 | 1457xG | 1.35 | 30.5 | 1.3-1.8 | 32.7 |
| 16 | 1266xG | 1.13 | 23.7 | 1.3-1.8 | 36.7 |

Compared to Example 2, the thickening efficiency with PVDF with horizontal decanter centrifuge was much higher.

Examples 17

A PVDF sample from the wash/additive addition vessel was processed with a 6" horizontal decanter centrifuge under various centrifugal forces and operating conditions. The decanter is equipped with plough tiles and a floater disc. The polymer content in the feed is approximately 4.4% by weight. The results are summarized below:

TABLE 4

| Exp No. | Centrifugal Force in G | Feed Rate in GPM | Scroll Speed In rpm | Pond Depth In mm | Polymer content in PVDF Effluent wt % |
|---|---|---|---|---|---|
| 1 (Base Case) | | | | | 16-19% |
| 17 | 219xG | 1.494 | 3.2 | 1.3-1.8 | 27% |

Compared to Example 2, the thickening efficiency with PVDF with horizontal decanter centrifuge was much higher even at a G force of 219.

What is claimed is:

1. A method for processing an aqueous polymer emulsion or suspension containing a continuous aqueous phase and polymer agglomerates and not containing an electrolyte, comprising the step of thickening said aqueous polymer emulsion or suspension by centrifuging the aqueous polymer emulsion or suspension in a decanter centrifuge to remove some of the continuous aqueous phase, wherein electrolyte is not added to the aqueous polymer emulsion or suspension prior to centrifuging and the polymer agglomerates have a density less than the aqueous continuous phase.

2. The method of claim 1 wherein said decanter centrifuge is a horizontal decanter centrifuge.

3. The method of claim 1 wherein the emulsion or suspension is an aqueous polymer emulsion or suspension entering the decanter centrifuge has a polymer solids level of from 1% to 30%, and preferably from 2% to 20%.

4. The method of claim 3 wherein the aqueous polymer emulsion of suspension entering the decanter centrifuge is an effluent from a polymerization reactor, a finishing unit, a wash unit, an additive addition unit or a thickening unit.

5. The method of claim 1 wherein said polymer agglomerates comprise as the polymer a fluoropolymer.

6. The method of claim 5 wherein said fluoropolymer is a homopolymer, copolymer, or terpolymer of polyvinylidene fluoride.

7. The method of claim 1 wherein said decanter centrifuge is run at a centrifugal force of from 100 to 4000 times gravity.

8. The method of claim 7 wherein said decanter centrifuge is run at a centrifugal force of from 150 to 3000 times gravity.

9. The method of claim 1 wherein said decanter centrifuge is run at a liquid residence time of from 5 seconds to 10 minutes.

10. The method of claim 9 wherein said decanter centrifuge is run at a liquid residence time of from 10 seconds to 5 minutes.

11. The method of claim 1 wherein said decanter centrifuge is run at a scroll speed of from 1 rpm to 100 rpm.

12. The method of claim 1 wherein said decanter centrifuge is run at a pool volume of 10% to 95% of the maximum pool volume.

13. The method of claim 1 wherein said decanter centrifuge contains a floater disc in the discharge side of the continuous phase.

14. The method of claim 1 wherein said decanter centrifuge has a beach angle between 5 to 25 degrees.

15. The method of claim 14 wherein said decanter centrifuge has a beach angle between between 8 to 15 degrees.

16. The method of claim 1 wherein said decanter centrifuge has a bowl length to bowl diameter ratio between 1:1 and 4:1, preferably between 2:1 to 4:1.

17. The process of claim 1 wherein said process involves a single decanter centrifuge step.

18. The method of claim 1 wherein said decanter centrifuge has a bowl length to bowl diameter ratio between 2:1 to 4:1.

* * * * *